UNITED STATES PATENT OFFICE.

GUSTAV ADOLPH BAUMGARTEN, OF SCHULENBURG, TEXAS.

COTTON-SEED FLOUR AND PROCESS OF MAKING THE SAME.

1,276,477.  Specification of Letters Patent.  Patented Aug. 20, 1918.

No Drawing.  Application filed September 21, 1915.  Serial No. 51,889.

*To all whom it may concern:*

Be it known that I, GUSTAV ADOLPH BAUMGARTEN, a citizen of the United States, residing at Schulenburg, in the county of Fayette and State of Texas, have invented certain new and useful Improvements in Cotton-Seed Flour and Processes of Making the Same; and I do hereby declare the following to be a full, clear, and exact description of the invention, such as will enable others skilled in the art to which it appertains to make and use the same.

This invention relates to cotton seed flour and the process of making the same, and has for an object to provide an edible flour from cotton seed.

A further object of the invention is to provide a flour from cotton seed meal from which the oil and the material of the walls of the oil cells have been removed.

A further object of the invention is to provide a process whereby the cotton seed is so treated that it may be ground to the fineness of wheat flour and bolted in the usual and ordinary manner.

In carrying out my present invention the cotton seed as it comes from the gin is first run through the linters of the usual and ordinary type to remove the surplus lint and the seed then run through a huller to remove the hull and cut up the seed. The huller is of the usual and ordinary type, whereby the kernel is separated from a very large portion of the hull, not more than three or four per cent. of the hull bran remaining upon the kernels after being so treated.

After the hulls have been removed the meats go to the rolls of the usual and ordinary type where the meats and oil cells are broken up and come from the rolls in flaked condition. The flakes are then run through a pulverizer of any usual and ordinary make, whereby such flakes are reduced to meal.

In this condition the meal goes to the cookers which are stepped as to steam pressure. The meal is cooked constantly under steam pressure beginning in the cooker under saturated steam at 60 to 75 pounds. From this first cooker the partially cooked meal is transferred to a second cooker where it is subjected to saturated steam at from 40 to 50 pounds pressure and lastly to a cooker where it is subjected to a pressure of from 15 to 25 pounds. In the latter cooker the temperature at which the mass is maintained is from 238 to 240 degrees Fahrenheit and the time in the several cookers is substantially equally divided so that the entire cooking process will consume one hour and forty minutes. In the first cooker the meal is received cold and dry from the crushers so that the higher temperature is maintained therein and if found necessary additional moisture is introduced into the cooker. As the meal progresses through the several steps of the cooking it is sometimes found that in the last cooker too much moisture is present, when the moisture is drawn out by the usual and ordinary exhaust applied to pressure cookers.

It has been found that by cooking the meal at the pressures above noted and for the time just described the material of the oil cells is loosened and disintegrated and from the last cooker, while still hot, the meal is run into the hydraulic cake former and subjected to a pressure of about 500 pounds per square inch to form into cakes with camel's hair presscloth as is usual and ordinary in such processes. Also after being formed into such cakes and while still hot the cakes are placed in the usual and ordinary hydraulic oil press to extract the oil from the same and submit it to a pressure of about 3500 pounds per square inch for a period of about twenty minutes, which almost completely extracts the oil from the meal.

From the hydraulic press the cakes are placed upon a rack for cooling to retain the nutty flavor of the seed.

After the cakes are thoroughly cooled they are ground to flour and bolted, the coarser particles being again ground and bolted in substantially the usual and ordinary manner until the entire mass has been reduced to the desired bolted fineness and the remaining bran separated.

The flour so produced is of impalpable fineness similar to the ordinary wheat flour of commerce, free from oil and from the material of the walls of the oil cells and will keep for an indefinite length of time, remains dry and not subject to packing or caking, or to heating like the ordinary seed cakes or seed meal which packing, coating and heating heretofore experienced is believed to be due to the presence of the material of the walls of the oil cells remaining in the meal which has likewise made cotton seed meal unboltable and unpalatable.

While the use of the flour thus formed forms no part of the present invention it is to be understood that a certain percentage of this cotton seed flour is mixed with a certain percentage of wheat flour for the making of bread, cakes and other culinary products. While the percentage of the flour so mixed may be varied to correspond to individual tastes it is found that from twenty to thirty per cent. of the cotton seed flour mixed with wheat flour produces a superior quality of flour for the purposes named.

While in the carrying out of the present process a number of machines and apparatuses are preferably employed it is to be understood that the present process is not confined to any form of apparatus and that any usual and ordinary type of the several machines and apparatuses may be employed, or that the entire process may be conducted substantially without apparatus, the apparatus being only a matter of convenience in handling.

I claim:

1. The process of producing a cotton seed flour, consisting in debranning the seed, cooking the seed for a sufficient length of time at a sufficient temperature to modify the coating of the oil cells, submitting to pressure to extract the oil and residue of the coating, grinding and bolting the same.

2. The process of producing a cotton seed flour, consisting in debranning the cotton seed, crushing the debranned meats, cooking the crushed meats for a sufficient length of time at a sufficient temperature to modify the coating of the oil cells, forming the cooked meal into cakes, subjecting the cakes to hydraulic pressure to extract the oil and residue of the oil cell coatings, cooling and drying the residuary cakes, grinding and bolting to flour.

3. The process of producing a cotton seed flour, consisting in debranning the cotton seed, subjecting the meats to cooking in a plurality of cookers under steam pressure decreasing in the several cookers, expressing the oil and disintegrated coating of the oil cells, grinding the residuary cakes and bolting the same to produce flour.

4. The process of producing cotton seed flour consisting in debranning the cotton seed, cooking the debranned seed under steam pressure in a plurality of cookers, the steam pressure decreasing at the several steps, expressing the cotton seed oil and the coating of the oil cells broken down by the cooking, drying, grinding and bolting the residuary cakes.

5. The process of producing cotton seed flour, consisting in debranning the seed, subjecting the debranned seed to a cooking process for substantially one hour and forty minutes at a temperature of approximately 238 to 240 degrees Fahrenheit, expressing the liquid and liquefied content, drying, grinding the residuary cakes and bolting the same to produce flour.

6. A cotton seed flour consisting of ground cotton seed meat from which the oil and coating of the oil cells have been extracted, such flour being of such fineness as to pass through the ordinary flour bolt.

7. A cotton seed flour comprising debranned ground cotton seed from which the oil cells have been extracted by combined thermal and mechanical means, such flour being of such fineness as to pass through the ordinary flour bolt.

In testimony whereof I affix my signature in presence of two witnesses.

GUSTAV ADOLPH BAUMGARTEN.

Witnesses:
E. R. VOGT,
R. O. PERKINS.